July 24, 1956

H. LINDARS 2,755,966

APPARATUS FOR DISPENSING MEASURED
QUANTITIES OF LIQUID MATERIALS

Filed April 30, 1951

Inventor
Herman Lindars
By Peck & Peck
Attorneys

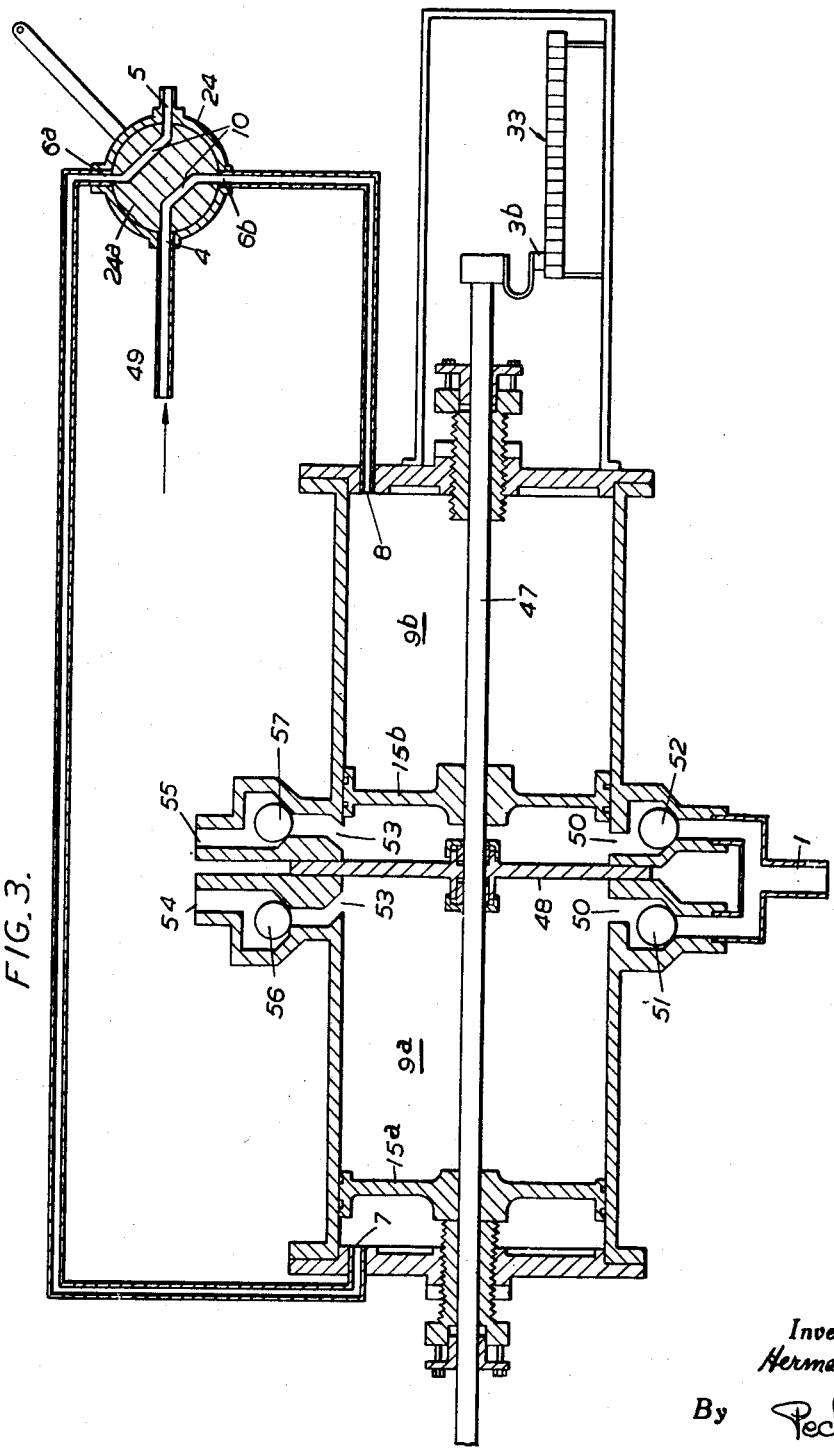

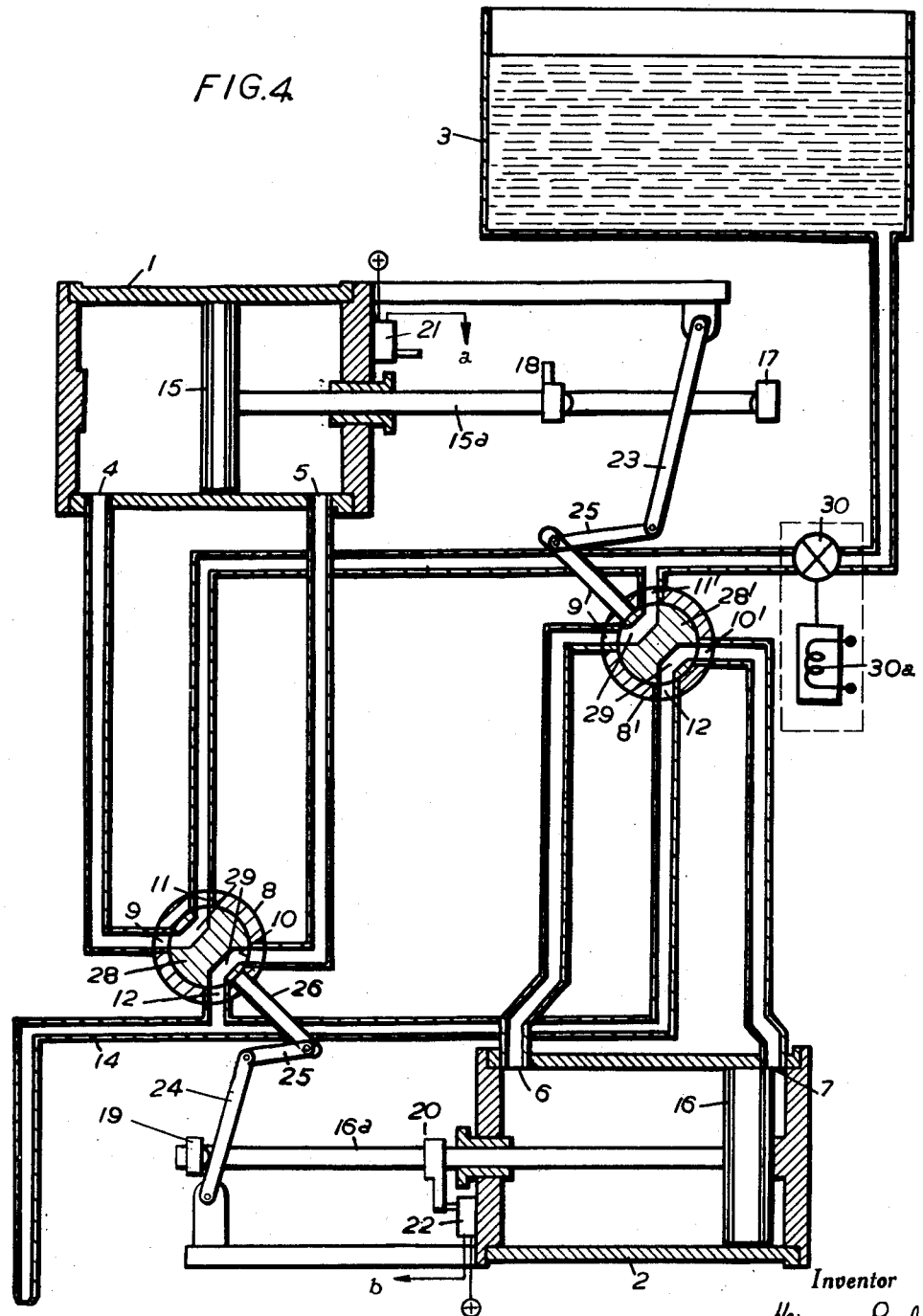

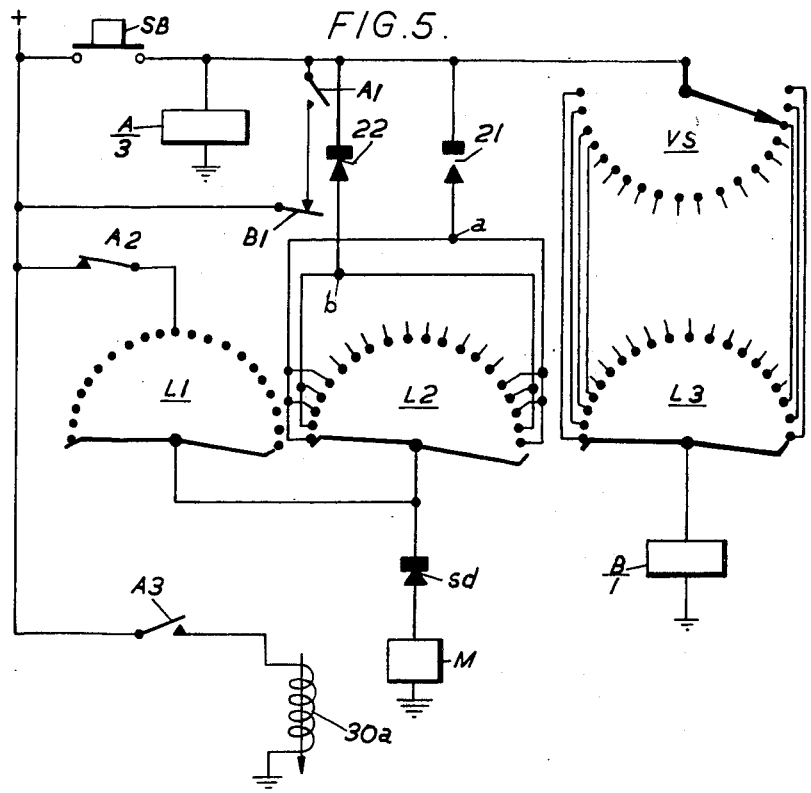
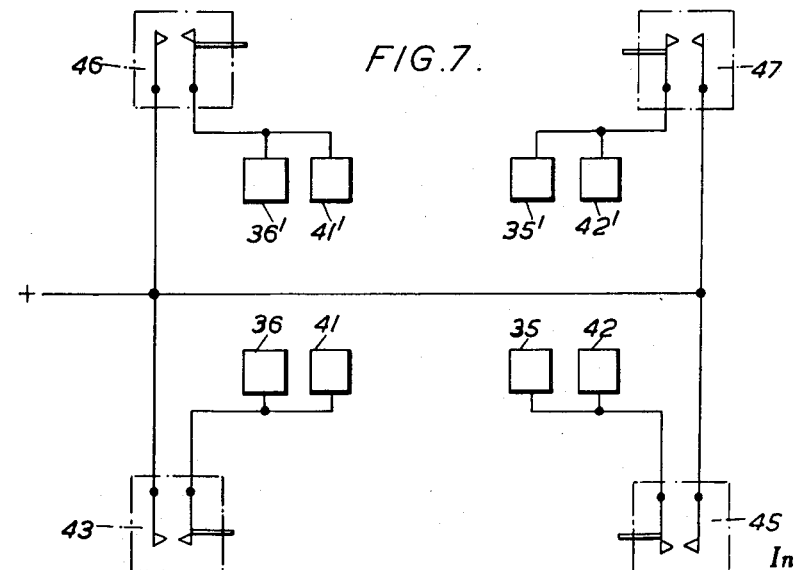

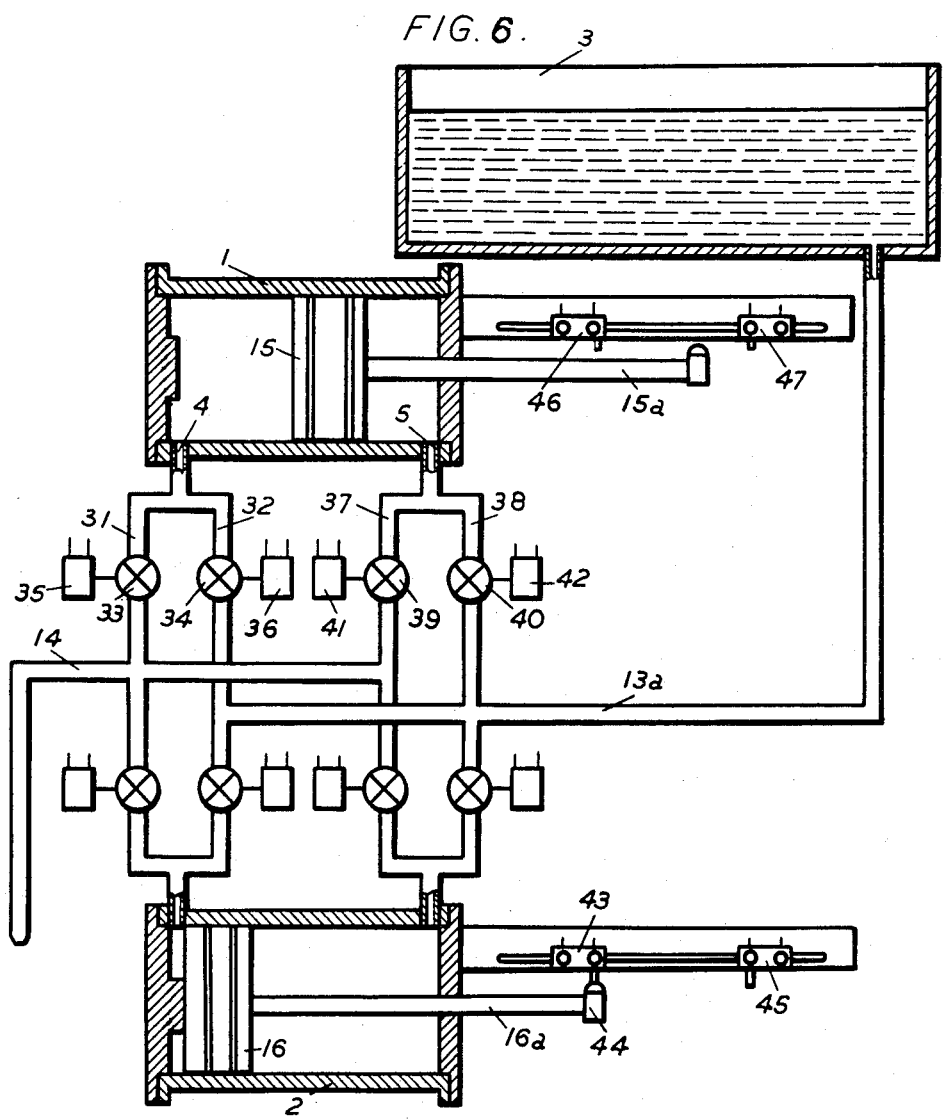

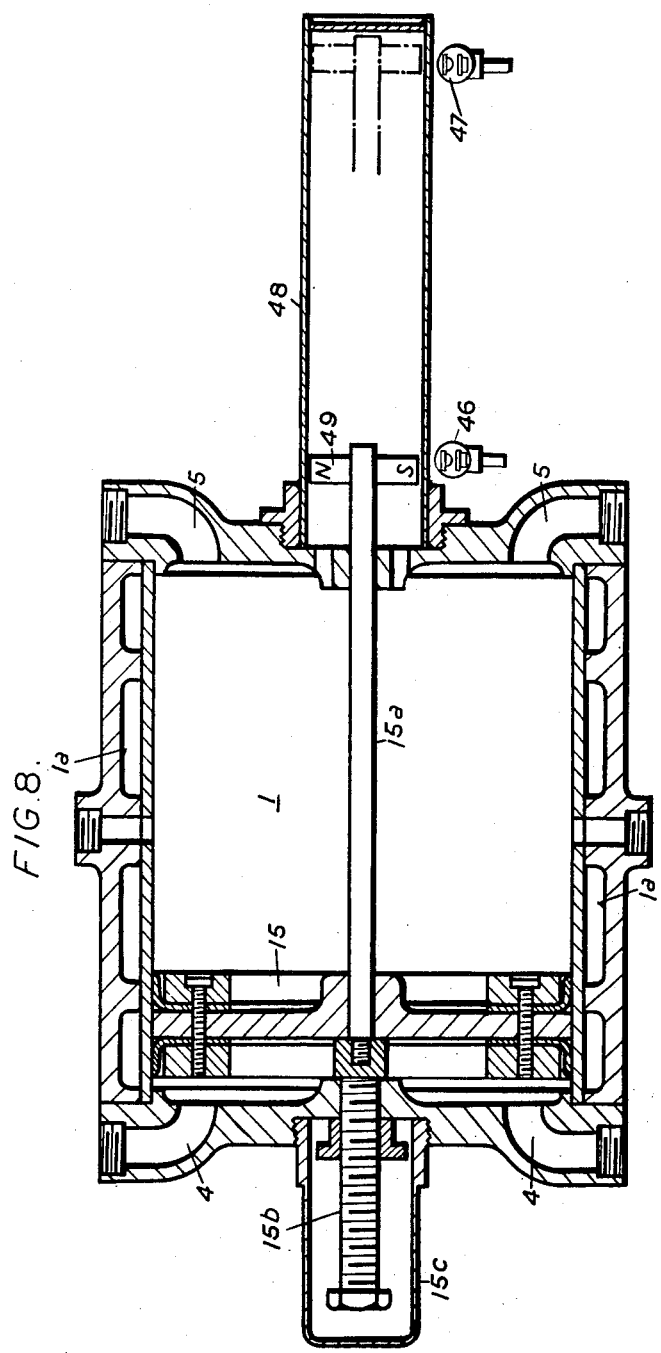

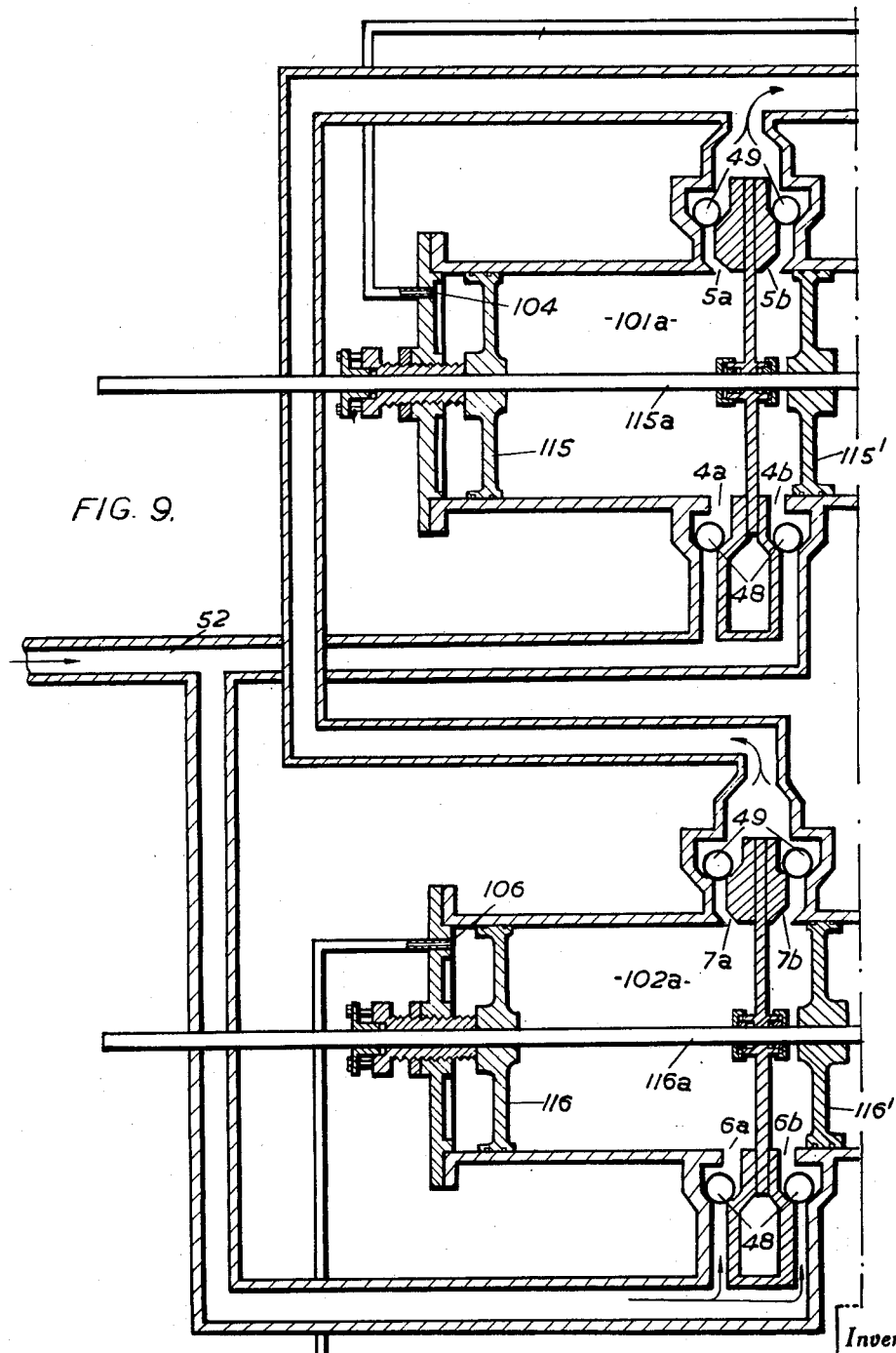

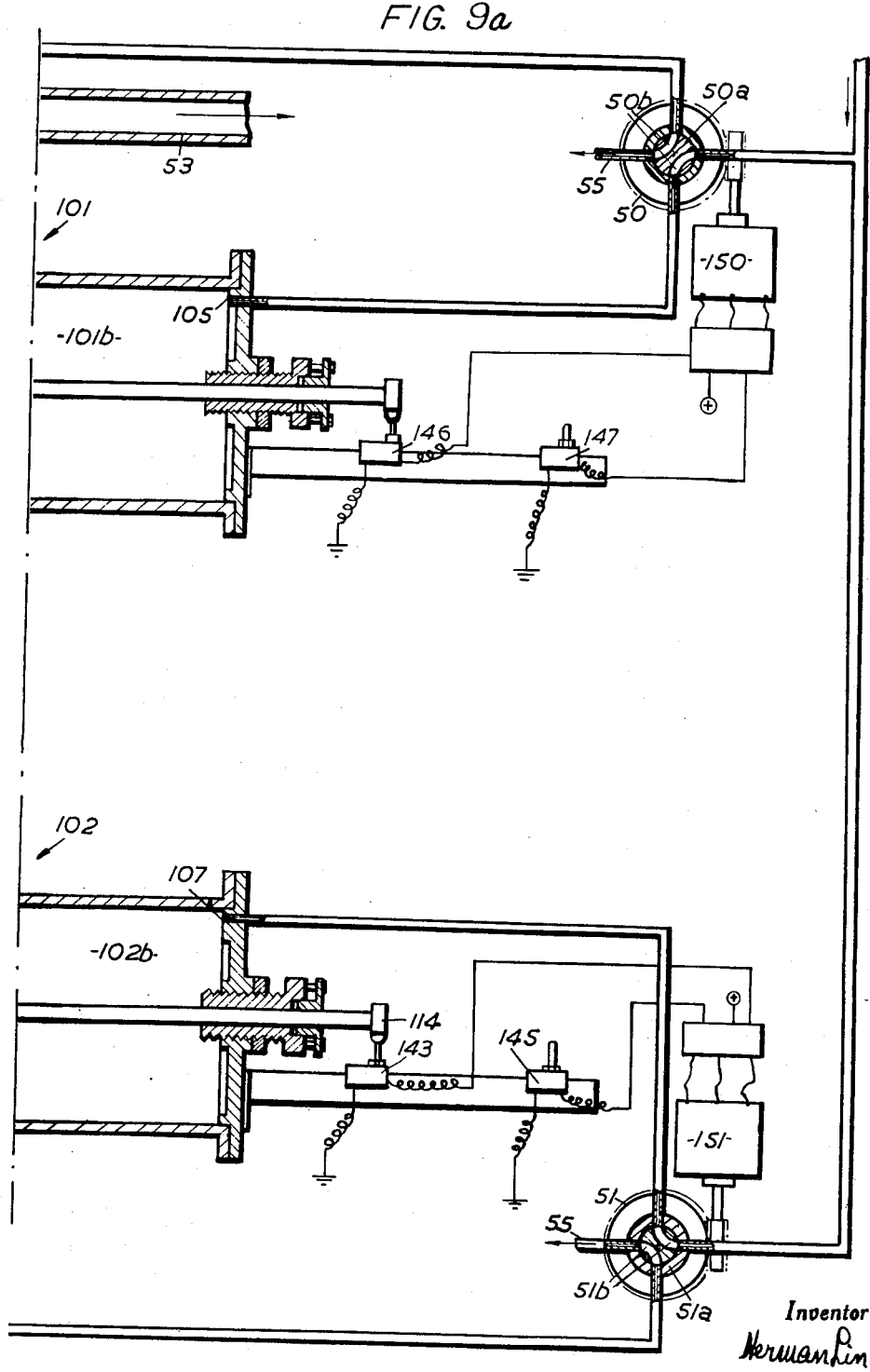

United States Patent Office 2,755,966
Patented July 24, 1956

2,755,966

APPARATUS FOR DISPENSING MEASURED QUANTITIES OF LIQUID MATERIALS

Herman Lindars, Sheffield, England

Application April 30, 1951, Serial No. 223,770

Claims priority, application Great Britain May 1, 1950

11 Claims. (Cl. 222—76)

This invention concerns apparatus for the delivery of measured quantities of materials of liquid or semi-liquid nature such as are substantially incompressible and can be delivered through pipes. Such materials are referred to herein for convenience as liquids.

It is an object of the present invention to provide apparatus which can be accurately calibrated. Another object is to provide apparatus which can be controlled from a distance to deliver a predetermined quantity of the material.

There are various types of liquid metering devices which employ members such as pistons, vanes, or the like metering elements which are directly displaced by the flow of the liquid being measured, the extent of displacement of the said elements being a measure of the volume of liquid passing through the device. Such metering devices can be arranged to operate valve or other cut-off means in the supply line through mechanism which can be pre-set to operate on delivery of a predetermined quantity of liquid as measured by the meter.

Meters having such movable elements which are directly displaced by contact with the fluid flowing therethrough suffer from certain disadvantages. For example, it is not normally possible to obtain an accuracy greater than one part in 500 at all rates of flow, even within the range of nominal rating of the meter. Moreover, at rates of flow below, say, 2½% of nominal rating, such meters may cease to operate at all. A further disadvantage is that it is usually necessary to filter the fluid passing through them so as to remove fine solid particles which may otherwise cause jamming of the metering elements—at least in the case of meters of smaller capacity dealing with flows up to, say 1000 gallons per hour. This requirement leads to the need for added servicing of the equipment and usually involves loss of time in the changing of filters.

A still further disadvantage of known forms of meter having positively displaceable metering elements which come in contact with the liquid is that fracture of the metering elements or associated mechanism may easily result from sudden starting or stopping of the flow of the liquid through the meter, and such failure may cause serious damage or inconvenience in the process with which the meter is associated. Moreover, where it is essential that the liquid being metered shall not be contaminated through contact with the atmosphere, adequate sealing of the metering chamber may be difficult to achieve without imposing an undue load on the metering element.

The present invention aims at overcoming the disadvantages mentioned above and at ensuring a high degree of accuracy coupled with a high degree of reliability.

According to the present invention, apparatus for the delivery of a predetermined volume of liquid comprises a metering chamber for the liquid, a positive displacement metering element which is reciprocable in the said chamber to discharge the liquid therein, and means operated by the metering element for controlling the extent of the displacement thereof in a discharging operation in accordance with the predetermined volume of liquid to be delivered.

Preferably, the metering chamber comprises a cylinder and the positive displacement element is constituted by a free piston slidable therein. Alternatively, the metering chamber may be of annular or part annular form, and the positive displacement element may be constituted by a vane which is oscillatable about the axis of curvature of the said chamber.

Advantageously, changeover valve means is associated with respective ports at each end of the metering chamber and are arranged so that one valve connects its associated port to the supply of liquid being measured whilst the other valve connects its associated port to a discharge point.

Various alternative embodiments of the invention will now be described with reference to the accompanying schematic drawings in which:

Fig. 3 illustrates a modified construction of metering chamber and displaceable element;

Fig. 4 illustrates a modified arrangement in which two separate metering chambers are connected to a common liquid supply but each have their respective changeover valves mechanically operated by the piston of the other chamber;

Fig. 5 is a diagram of the circuit for controlling the operation of the apparatus shown in Fig. 4;

Fig. 6 illustrates an arrangement similar to that of Fig. 4 but having separate inlet and exhaust valves for each port of each metering chamber, these valves being electrically operated;

Fig. 7 illustrates a circuit diagram for controlling the electrical valve operating mechanism shown in Fig. 6;

Fig. 8 shows a modified form of cylinder shown in Figs. 4, 6 and 9 and contact operating means for electrically operated changeover valves, and Fig. 9 shows an alternative form of apparatus according to the invention in which each metering element is displaced by fluid under pressure derived from an independent source.

Fig. 9a is a continuation and part of the apparatus illustrated in Fig. 9.

Throughout the drawings like parts bear similar reference numerals.

Figure 1:
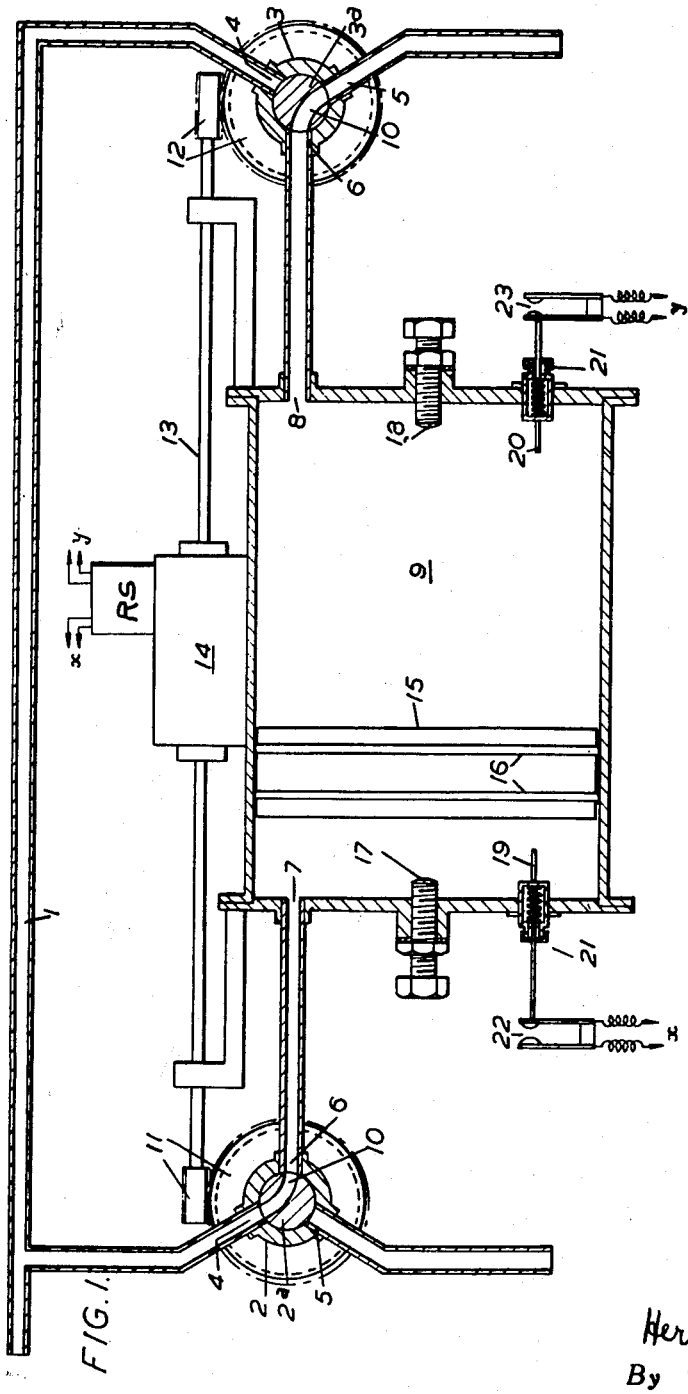
Fig. 1 is a sectional view of a simple form of liquid dispensing apparatus.

Referring first to Fig. 1 of the said drawings, the liquid to be dispensed is supplied through a main supply line 1 to a pair of change-over rotary valves 2, 3. Each valve has one radial port 4 connected to the supply line 1 and constituting the inlet port, and a second or outlet port 5 connected to a common discharge point (not shown). The third radial port 6 in each valve 2, 3 is connected to a corresponding port 7, 8 respectively at opposite ends of a cylinder 9 which constitutes the metering chamber. The ports 4, 5, 6 in each of the rotary valves 2, 3 are arranged at 120° to each other, and the port 6 is placed in communication with either the inlet port 4 or the outlet port 5 by means of a duct 10 formed in the rotary valve members 2a, 3a respectively in each change-over valve 2, 3. The rotary valve members 2a, 3a are connected through respective gearing 11, 12 to a common shaft 13 which is rotated by an electric motor 14. The gearing 11, 12 is arranged so that one rotary valve member—say the member 2a—is in the position (as shown) for connecting its inlet port 4 to the cylinder port 6, whilst the other rotary valve member 3a is in the position (as shown) for connecting its cylinder port 6 to the discharge port 5, and vice versa. The shaft 13 is arranged to be rotated by the motor 14 in the sense for reversing the states of the change-over valves simultaneously so that when liquid is admitted through one port 7 or 8 in the cylinder 9, other liquid may be discharged through the other port 8 or 7, as the case may be, to the common discharge point.

Within the cylinder 9 works a free piston 15 which is provided with the usual piston rings 16 for preventing leakage of the liquid between the piston and the cylinder wall. Each end wall of the cylinder 9 is provided with an axially adjustable abutment 17, 18 which engages the piston 15 and defines the limit of its travel in the appropriate direction. Also projecting through each end wall is an operating rod 19, 20 respectively which passes through a sealing gland 21 for preventing leakage of liquid past the rod. The rods 19, 20 project into the cylinder 9 far enough to engage the piston 15 shortly before it strikes the appropriate abutment 17, 18, whilst at their outer ends they engage one of a corresponding pair of electrical contacts 22, 23. These contacts, as indicated by x and y, are connected in circuit with a reversing switch RS which, when operated, reverses the direction of rotation of the motor 14.

The device operates as follows:

Liquid under pressure is supplied through the main 1 to the inlet ports 4 of the change-over valves 2, 3. Only one of these inlet ports is in register with the passage 10 in the rotary valve member 2a or 3a (in the drawings, this is the state of the valve 2), the other port 4 being blanked off by the other valve member. Liquid from the supply line is thus admitted to the left hand side of the piston 15 and causes displacement thereof towards the right hand abutment 18. At the same time, the valve 3 has its rotary valve element 3a in position for connecting the cylinder port 8 with the discharge point through its ports 6 and 5 and valve passage 10, so that any liquid within the cylinder 9 to the right of the piston 15 is discharged as the piston advances. When the piston approaches the limit of its travel, it strikes the inner end of the rod 20 and closes the contacts 23. The electric reversing switch RS is thereupon operated and the driving motor 14 is energised to rotate the shaft 13 in the direction for changing over the valves 2, 3 so as to reverse their respective states. The piston 15 is then arrested by the stop 18.

As soon as the valves 2, 3 have been changed over, the inlet port 4 in the valve 2 is blanked off, whilst the inlet port 4 in the valve 3 is placed in communication with the port 6 by way of the valve passage 10 so that liquid from the main 1 is now admitted to the cylinder 9 on the right hand side of the piston 15. Simultaneously the cylinder port 7 is connected through the passage 10 in the valve 2 to the discharge port 5. The piston is thus caused to travel to the other end of the cylinder, discharging the volume of liquid previously admitted to its left hand side. It will be noted that the contacts 23 remain closed until the piston 15 moves towards the opposite end of the cylinder so that the motor 14 remains energised until the valves 2 and 3 have been fully changed over.

It will be thus seen that after the abutments 17 and 18 are set so that the piston 15 sweeps the desired volume at each stroke, the device constitutes a liquid measuring and dispensing apparatus having a degree of accuracy considerably in excess of a meter of the rotating vane or similar type. Moreover, since the piston 15 is moved solely by the pressure of the fluid on the inlet side, no inaccuracies are introduced by wire-drawing effects.

In a practical embodiment of the above described device, if the cylinder is approximately ten inches in length and has a bore of six inches whilst the piston has a thickness of two inches, the stops 17, 18 can be adjusted so that one gallon of liquid is delivered on each complete stroke of the piston. This volume can be adjusted to within very fine limits—for example, of the order of one part in five thousand.

If the quantity of liquid to be delivered at the discharge point is a multiple of the swept volume of the cylinder 9, each metering operation of the apparatus involves a plurality of strokes of the piston 15, and it will be appreciated that counting mechanism may be associated either with the contacts 22, 23 (in the case of electrically operated counting mechanism) or with the push rods 19, 20 (in the case of mechanically operated counting mechanism) which is operative to control either a main valve (not shown) in the supply line 1 for interrupting the supply of liquid to the changeover valves 2, 3 or a main switch in the circuit of the motor 14, after the discharge of each predetermined volume of liquid. Such mechanism may be of any convenient kind, but one electrically operated form is illustrated in Figure 2 of the drawings.

Figure 2:
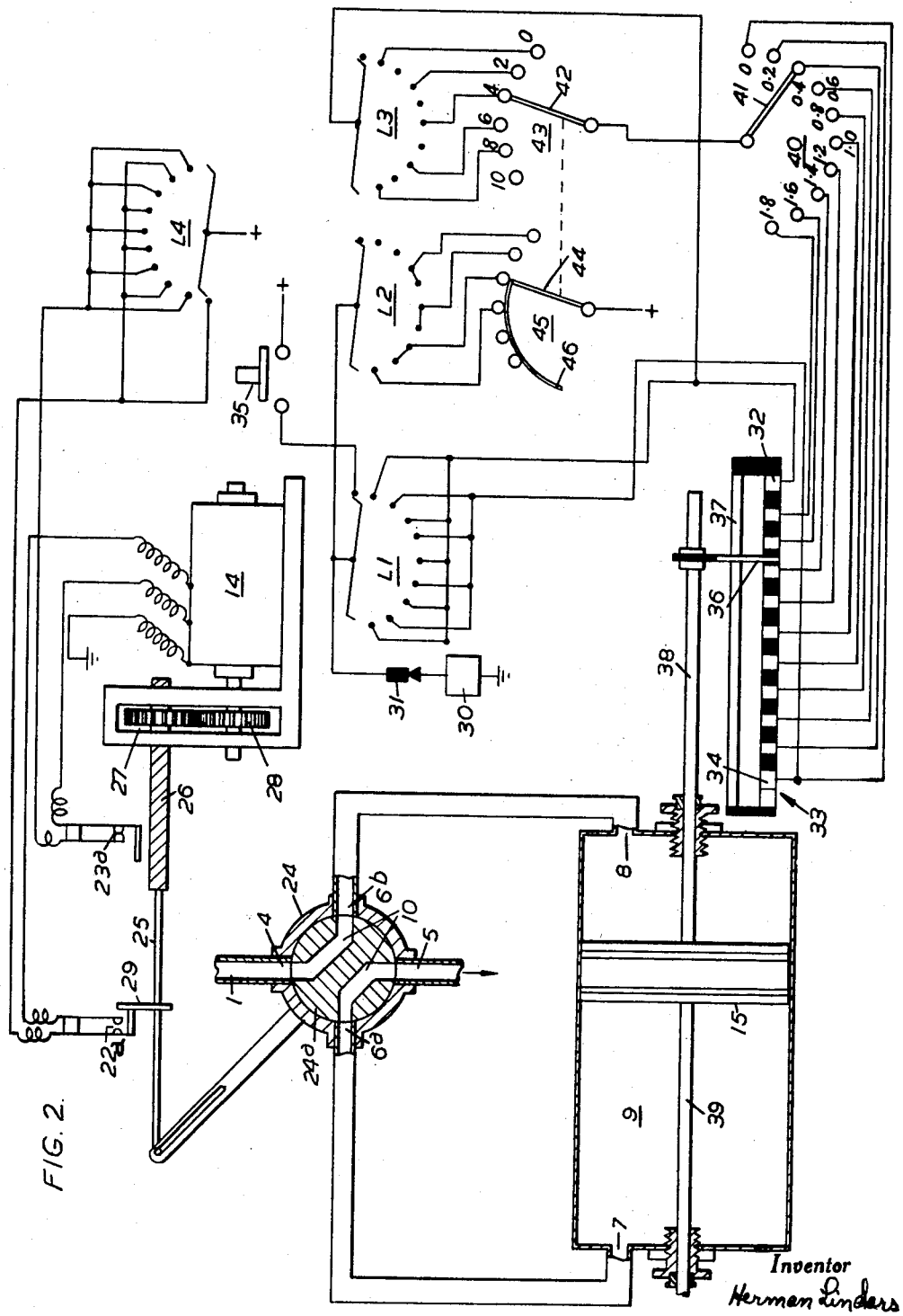
Fig. 2 illustrates diagrammatically an automatic control system for controlling the extent of the displacement of the piston in Fig. 1, whereby predetermined quantities of fluid may be automatically dispensed.

In the arrangement illustrated in Figure 2, the control valves 2, 3 are combined into a single valve unit 24 having diametrically opposed inlet and discharge ports 4, 5 respectively, and diametrically opposed ports 6a, 6b communicating with the left and right hand ports 7, 8 respectively in the cylinder 9. The rotary valve member 24a in the changeover valve 24 is provided with two independent ducts 10, the one duct controlling the admission to or exhaust from the cylinder port 7, whilst the other controls admission to or exhaust from the cylinder port 8.

The motion of the changeover valve member 24a is controlled by a slidable and non-rotatable rod 25 having a screw-threaded end portion 26 which works in the internally-threaded boss of a gear wheel 27 which meshes with another gear wheel 28 on the shaft of the valve operating motor 14. Rotation of the motor 14 in one or other direction thus effects the lengthwise travel of the valve operating rod 25, and so effects the changeover operations of the valve 24.

The valve operating rod 25 carries an abutment 29 for operating alternately one or other of a pair of contacts 22a, 23a which control the operation of the motor 14. Each of these sets of contacts is connected in circuit with alternate contacts on the level L4 of a uniselector switch whose driving magnet is indicated at 30 in series with self-drive contacts 31. The wiper on the level L4 is connected to the positive main and, in conjunction with the contacts 22a, 23a constitutes a reversing switch for the motor 14.

The level L1 of the uniselector has all its contacts except the first alternately grouped into two series. The series containing the second, fourth, sixth . . . contacts is connected to the right hand end segment 32 of a commutator-like straight contact bar 33 having alternate conducting and insulating segments along the length thereof spaced at regular intervals, the pitch of the conducting segments being equal to, say, one-tenth of the full travel of the piston 15 in the cylinder 9. The other end conducting segment 34 is connected to the other group of contacts on the level L1 consisting of the third, fifth, seventh . . . contacts. The first contact on this level is connected to the positive main through the normally open contacts of a "Start" push button 35.

A contact brush 36 co-operates with the contact bar 33 and with a continuous conducting bar 37 which is connected to the positive main. The brush 36 is secured on a piston rod 38 which projects through an end wall of the cylinder 9 and is fixed to the piston 15. A corresponding rod 39 of the same diameter is secured to the other side of the piston 15 to project through the opposite wall of the cylinder 9 so as to equalize the swept volume on either side of the piston. It will thus be seen that during each stroke of the piston 15, the brush 36 is traversed from the one end segment 32 to the other end segment 34 of the contact bar 33 so that each conducting segment is energised in turn from the positive main. The contact bar 33 is preferably adjustable lengthwise for initial setting purposes.

The end segment 32 is directly connected to the wiper on the third level L3 of the uniselector switch, whilst the end segment 34 is connected to the zero contact of a manually set fractional volume rotary selector switch 40. The remaining intermediate segments on the bar 33 are connected in order to the remaining contacts of the selector switch 40. Each of these contacts on the switch 40 thus corresponds to a given fraction of the swept volume of the cylinder 9, but is calibrated in terms of twice the fractional volume. In the example illustrated, the calibration of the contacts ranges from zero to 1.8 times the swept volume.

The switch arm 41 of the switch 40 is connected in series with the switch arm 42 of a similar rotary selector switch 43, the contacts of which are connected to the even-numbered contacts on the third bank L3 of the uniselector, the wiper of this bank being connected to the group of even-numbered contacts on the level L1. To the switch arm 42 is mechanically linked a further switch arm 44 of a third rotary selector switch 45, this arm carrying an arcuate short-circuiting contact 46 in known manner. The contacts of the third rotary switch 45 are connected to the fourth, sixth, eighth and tenth contacts on the level L2 of the uniselector. The fourth, sixth and eighth contacts are strapped to the fifth, seventh and ninth contacts respectively. The wiper on level L2 is connected direct to the self-drive contacts 31 for the driving magnet 30 of the uniselector.

In operation, where the volume to be delivered from the cylinder 9 is an odd or non-integral multiple of the swept volume of the cylinder, the switch arms 41, 42 are moved to the appropriate positions on their respective switches, the switch 43 being calibrated in terms of even multiples of the swept volume. The piston 15 is at one end of its cylinder where it is held by the pressure of the fluid from the liquid supply main 1 through the appropriate ports in the changeover valve 24. In this position of the ports, the changeover valve operating rod 25 is in one extreme position of its travel in which it holds open one set of contacts 22a, 23a, as the case may be, this set being in circuit with the contact on the fourth level L4 of the uniselector switch which is engaged by the wiper on that level. The circuit to the motor 14 is thus broken at the open pair of contacts 22a or 23a.

When the start button 35 is pressed, the circuit to the driving magnet 30 of the uniselector is completed through the first contact on the first level L1, and the uniselector is stepped round one contact space. This brings the wiper on level L4 on to the next contact which is in series with the closed pair of contacts 23a or 22a and energises the motor 14 so as to reverse the connections in the changeover valve 24. The piston 15 is thus moved to the other end of the cylinder 9, displacing the volume of liquid on the outlet side through the discharge port 5 of the changeover valve 24.

As the piston 15 moves, the contact brush 36 is moved over the segments of the contact bar 33 until it makes contact with that conducting segment which is connected through the manual selector switches 40 and 43 and the levels L3 and L1 to the driving magnet 30 of the uniselector. The said segment may be encountered during the first stroke of the piston, in which case the uniselector is stepped round one further contact. This effects reversal of the motor 14 on the level L4 and the valve 24 is changed over. The fluid pressure in the supply main 1 is thus applied to the opposite side of the piston 15 whilst the previous pressure side of the piston is opened to the discharge port 5. The required volume of liquid is thus discharged as the piston returns to its initial position, and the brush 36 reaches the starting end of the contact bar 33. When it returns to this position, the contact on which the wiper at level L1 is then standing becomes energised from the positive main and the uniselector is stepped round to its fourth position.

If the required volume of liquid to be discharged was less than the volume of the cylinder 9, the fourth contact on the second level of the uniselector will already be energised through the switch arm 44 of the rotary switch 45 so that the driving magnet 30 of the uniselector is energised. It will be seen from the circuit diagram that this energisation is maintained throughout the remaining travel of the wiper on the second level L2, all its contacts being energised through the short-circuiting contact 46 which is attached to the switch arm 44. The uniselector thus "homes" and the driving motor 14 is open circuited. No further operation of the piston 15 therefore takes place and the apparatus is automatically re-set in readiness for the next discharge operation.

A similar sequence of events occurs if the volume of liquid to be discharged is greater than the swept volume of the cylinder 9. It will thus be seen that the apparatus constitutes an automatically controlled liquid metering device for discharge predetermined quantities of liquid. It will also be understood that the manually operated selector switches 40 and 43, together with the uniselector and start button 35, may be remotely located—as for example, in a control room of an industrial plant.

The uniselector may be replaced by a series of electromagnetic relays connected in cascade. The contact bar 33 may also be replaced if desired by a rotary commutator which is driven through rack and pinion mechanism from the piston rod 38. The brush 36 is then mounted on a fixed part of the frame of the apparatus and may be provided with a fine adjustment for the initial setting of the apparatus. Any alternative arrangement of reversing contacts 22a, 23a and driving means for the changeover valve 24 may be adopted as desired.

Figure 3 of the drawings illustrates a power-operated form of liquid metering device in distinction to the self-operating type illustrated in Figures 1 and 2 of the drawings in which the pressure of the fluid to be metered itself produces the necessary metering action of the piston 15. In the arrangement of Figure 3, two pistons 15a, 15b are mounted on a common piston rod 47 and work in coaxial cylinders 9a, 9b respectively which are separated by a partition wall 48. The piston rod 47 extends through the opposite end walls of the cylinders 9a, 9b and carries at its one end a brush contact 36 which is movable over a contact bar 33 arranged similarly to that shown in Figure 2.

The rotary changeover valve 24 is also similarly arranged to that shown in Figure 2, above, except that its inlet port 4 is connected to a compressed air line 49. The ports 6a, 6b are connected to the ports 7, 8 in the outer ends of the cylinders 9a, 9b respectively. The inner or adjacent ends of these cylinders are each provided with an inlet port 50 which is connected through a respective non-return inlet valve 51, 52 to the supply main 1 for the liquid to be metered. The adjacent ends of the cylinders 9a, 9b also have liquid discharge ports 53 which are connected to outlet ducts 54, 55 respectively through non-return valves 56, 57. The electrical circuit and changeover valve operating mechanism may be as illustrated in Figure 2.

In the operation of this arrangement, the one piston—say, 15a—is exposed by the control valve 24, to air pressure and both pistons 15a, 15b are moved to the other ends of their respective cylinders. During this travel, the piston 15a displaces the liquid in the cylinder 9a through the outlet port 53, the non-return inlet valve 51 being held on its seating in the usual way. Simultaneously, the piston 15b draws liquid from the supply main 1 through the non-return valve 52 and inlet port 50 into the cylinder 9b. If more liquid is required to be delivered, the changeover valve 24 is automatically reversed and the liquid in the cylinder 9b is discharged through its outlet port 53 and non-return valve 57 whilst further liquid is drawn into the cylinder 9a through its inlet port 50. It will thus be seen that the operation of this arrangement is substantially equivalent to the operation of the arrangement shown in Figures 1 and 2.

Referring now to Fig. 4 of the drawings, two independent metering chambers 1, 2 (constituted by cylinders) are shown connected to a common liquid supply 3. Each cylinder has ports 4, 5 and 6, 7 respectively opening through a wall thereof at opposite ends to constitute alternatively inlet and exhaust ports for liquid to be delivered in measured quantities. The ports 4, 5 in the cylinder 1 are controlled by a changeover valve 8 having ports 9 and 10 permanently connected to the ports 4, 5 respectively, and ports 11, 12 connected the one through a main control valve 30 to the liquid supply 3, and the other to a discharge line 14. A similar changeover valve 8' is associated with the cylinder 2 having ports 9', 10', 11' and 12' which are correspondingly connected to the cylinder 2, supply 3 and discharge line 14.

Within the cylinders 1, 2 are mounted respective reciprocable pistons 15, 16 each having the usual piston rings or other fluid-tight packings to prevent leakage of liquid past the piston. Each piston has attached thereto a piston rod 15a, 16a respectively, the piston rod 15a carrying spaced stops 17, 18 whilst the piston rod 16a carries similar spaced stops 19, 20. The stops 18 and 20 are arranged to co-operate with electrical limit switches 21, 22 respectively which are connected in the circuit of a counting mechanism which may be pre-set according to the volume of liquid required to be delivered through the discharge line 14, and to effect the closure of the main stop valve 30 when this quantity has been discharged. The circuit of the said counting mechanism is illustrated in Fig. 5 to be described below.

Each pair of stops 17, 18 and 19, 20 co-operates with a respective pivotally mounted lever 23, 24 which is connected by suitable linkage 25 to an arm 26, 27 which is secured to the rotary valve element 28, 28' of the changeover valve 8, 8' associated with the other cylinder. Each rotary valve element 28, 28' has a pair of ducts 29, 29' formed therein and arranged so as to connect the ports 9, 10 or 9', 10', as the case may be, alternatively to the appropriate inlet ports 11, 11' and outlet ports 12, 12' as will be understood from the drawings.

In operation of the apparatus so far described, when the main stop valve 30 is opened, liquid flows from the reservoir 3 to the inlet ports 11, 11' and thence through the changeover valves 8, 8' to the one or other port in each of the cylinders 1, 2. In the arrangement shown in the drawings, when the main stop valve 30 is opened, liquid from the reservoir 3 is supplied to the ports 4 and 6 in the cylinders 1, 2 respectively.

Since the piston 16 in the cylinder 2 is at the extreme limit of its travel, no further fluid can flow through the port 6. The piston 15 in the cylinder 1, however, is in an intermediate position of its travel, and liquid from the reservoir 3 flows through the changeover valve 8 and port 4 into the space behind the piston 15. At the same time, the port 5 in the cylinder 1 is connected through the changeover valve port 10 and duct 29 to the exhaust port 12 and discharge line 14. The piston 15 is thus moved to the right by the pressure of the liquid admitted through the port 4 and discharges liquid through the port 5.

As the piston 15 approaches the end of its travel to the right, the stop 18 on the piston rod 15a engages the lever 23 and causes the rotary valve element 28' of the changeover valve 8' to be moved to its other position in which the port 7 in the cylinder 2 is opened to the inlet port 11', while the port 6 is opened to the discharge port 12'. Liquid is thus admitted behind the piston 16 under pressure from the head in the reservoir 3, and displaces the piston to the left in the drawing. The liquid already in the cylinder 2 is thus discharged through the port 6 and changeover valve 8' to the discharge line 14.

The changeover of the valve 8' is arranged to be completed as the piston 15 in the cylinder 1 reaches or nears the end of its stroke and discharge of liquid through the port 5 and changeover valve 8 to the discharge line 14 ceases. The ports can thus be arranged to operate so that there is a substantially uniform flow of liquid in the discharge line 14.

A similar sequence of events takes place as the piston 16 approaches the end of its travel and causes the rotary valve element 28 of the changeover valve 8 to be turned so as to change over the connections to the ports 4, 5 in cylinder 1. As soon as the valve 8 completes its changeover operation, the piston 15 moves back in the cylinder 1 and discharges liquid through the port 4 which previously acted as the inlet port. It will thus be seen that the pistons 15, 16 are moved alternately and are automatically controlled by each other.

The automatic control circuit shown in Fig. 5 consists essentially of a uniselector switch having three contact levels L1, L2, L3, driving magnet M and self-drive contacts sd in series therewith, together with a multi-position volume selector switch VS and electro-magnetic relays A/3 and B/1. A start button SB has its contacts connected between the positive main and the winding of the relay A/3. A hold-on circuit for the relay A/3 and for maintaining the connection of the positive main to the limit switches 21, 22 and the switch arm of the volume selector switch VS is provided by normally closed contacts B1 and normally open contacts A1. The several contacts of the multi-position volume selector switch VS are connected to corresponding contacts on the uniselector level L3, whilst the limit switches 21, 22 are connected alternately to the contacts on the level L2. All contacts except the first on the level L1 are strapped together and are connected to the positive main through normally closed contacts A2. The wipers on levels L1 and L2 are connected together and to the self-drive contacts sd, of the uniselector whilst the wiper on level L3 is connected to the winding of the relay B/1. The motor or solenoid 30a controlling the main stop valve 30 is connected to the positive main through normally open contacts A3.

In operation of the circuit, the switch arm of the multi-position volume selector switch VS is first set to the contact representing the desired volume of liquid to be delivered by the apparatus. The start button SB is then depressed to complete the circuit to the relay A/3. This relay closes its hold-on contacts A1, thus permitting release of the start button SB. At the same time, the contacts A2 are opened so as to deenergise the strapped contacts on the level L1, whilst the contacts A3 are closed and the solenoid or motor 30a controlling the main stop valve 30 is energised to open the valve.

At the commencement of the cycle of operations, each of the pistons 15, 16 (Fig. 4) is at the inner end of its travel, so that the limit switches 21, 22 are closed. The positive main is thus connected through the contacts 21 and the first contact on the uniselector level L2 to the self-drive contacts sd and the driving magnet M of the uniselector. The uniselector wipers are accordingly stepped round one contact, and at the same time the piston 15 begins its outward stroke, thus opening the limit swith 21. Since the second contact on the level L2 is connected to the positive main through the limit switch 22, which, as shown in Fig. 4, is closed by the stop 20 on the piston rod 16a of the piston 16, the uniselector is again stepped round to the third position in which the wiper on the level L2 stands on the next contact connected to the limit switch 21. Owing to the travel of the piston 15 on its outward stroke, this switch is open and the uniselector therefore stops.

When the piston 15 has completed its outward stroke, the change-over valve 28' associated with the cylinder 2 is operated by the stop 18 on the piston rod 15a and the fluid pressure is then applied behind the piston 16. This piston, accordingly, commences its outward travel and opens the limit switch 22. At the end of its travel, it reverses the change-over valve 28 associated with the cylinder 1 so that the piston 15 commences its return stroke. At the end of this stroke, the stop 18 closes the limit switch 21 and the uniselector driving magnet M is again energised through the third contact on the level L2 and steps round to the next position. In this position, the wiper on the level L2 stands on the 4th contact which is in series with the limit switch 22, and, since this is open by virtue of the piston 16 being at the outer limit of its travel, no further movement of the uniselector wipers takes place at this stage.

As the piston 15 nears the limit of its inward stroke, the changeover valve 28' is again thrown over and the piston 16 is driven back on its inward stroke. When it reaches the limit of this stroke, the limit switch 22 is closed, thus energising the fourth contact on the level L2 of the uniselector and causing a further step round of the wipers.

This alternate operation of the pistons 15 and 16 continues until the uniselector has stepped round to a position in which the wiper on the level L3 reaches the contact corresponding to the contact on the volume selector switch VS to which the arm of this switch has been set. When this occurs, the relay B/1 is energised to break the hold-on circuit of the relay A/3 at the contacts B1. The relay A/3 thereupon releases and opens the circuit of the motor or solenoid 30a which operates the main stop valve 30. The valve thereupon closes, and further operation of the pistons, 15, 16 ceases.

At the same time, the normally closed contacts A2 are allowed to reclose and the positive main is connected through the strapped contacts on the level L1 of the uniselector to the self-drive contacts sd and the magnet M so that the uniselector homes to its zero position in readiness for the next operation. The relay B/1 has meanwhile become deenergised by the removal of the positive main from the contacts on the level L3 of the uniselector through the opening of its contacts B1 and remains deenergised until a further operation of the circuit brings the wiper on the level L3 into engagement with a live contact.

It will thus be seen that the apparatus automatically delivers a predetermined volume of liquid which is a multiple of the swept volume of the cylinders 1 and 2.

In the arrangement shown in Figures 6 and 7 of the drawings, the port 4 at one end of the cylinder 1 is connected to branched pipes 31, 32 in each of which is connected stop valves 33, 34 respectively. These valves are controlled by separate electromagnets or solenoids 35, 36 respectively. The valve 33 serves to connect the pipe 31 to the common discharge line 14, whilst the valve 34 serves to connect the pipe 32 to the common supply line 13a leading from the reservoir 3. The port 4 may thus be connected either to discharge or to the reservoir. Similarly, the port 5 is connected to branched pipes 37, 38 having respective stop valves 39, 40 connected therein for controlling the connection of the port 5 to the discharge line 14 or the supply line 13a respectively. These stop valves are controlled by respective electromagnets 41, 42.

The windings of the electromagnets 35, 42 are connected by a circuit (shown in detail in Fig. 7) to a common supply through a control switch 43 which is closed by a collar 44 mounted on the piston rod 16a associated with the cylinder 2. In the arrangement shown in the drawings, therefore, the piston 15 in the cylinder 1 will be moved to the left. At the same time, the magnets 36, 41 controlling the stop valves 34, 39 are connected to the common supply through a control switch 45 which is adapted to be closed by the collar 44 on the piston rod 16a when the piston 16 reaches or nears that end of its stroke in the cylinder 2.

It will be understood that as soon as the collar 44 disengages the operating member of the control switch 43, the magnets 35, 42 are de-energised and allow the valves 33, 40 to close. Since the magnets 36, 41 associated with the valves 34, 39 respectively remain deenergised until the piston 16 reaches the other end of its stroke, the ports 4, 5 in the cylinder 1 are cut off from both the common supply line 13a and the common discharge line 14a so that no travel of the piston 15 in the cylinder 1 takes place.

A similar arrangement of valves is provided for the cylinder 2, the electromagnets being similarly controlled by switches 46, 47 associated with the piston 15 in the cylinder 1. It is not thought necessary to describe the operation of the valves controlling the cylinder 2 since it is identical with the arrangement already described in connection with the valves associated with the cylinder 1.

The circuit diagram of Figure 7 illustrates the connections between the various electromagnets controlling the valves and the piston operated control switches 43, 45, 46, 47. As will be seen from the diagram, each of the said switches consists of a pair of normally open contacts, the one contact on each pair being permanently connected to the positive main of a D. C. supply. The other contact of each control switch is connected to the appropriate pair of magnets. Thus, the said other contact in the control switch 43—which is closed when the piston 16 (Figure 6) reaches the inner limit of its travel—is connected to the magnets 35 and 42. These are thereupon energized to open the port 4 in the cylinder 1 to the delivery line 14 and the port 5 to the supply line 13a. The piston 15 is therefore moved to the inner limit of its travel.

When this occurs, the control switch 46 is closed to energise the magnets 36', 41', which thereupon open their associated valves to connect the supply line 13a to the port at the inner end of the cylinder 2, whilst the port at the outer end thereof is opened to the discharge line 14. The piston 16 is accordingly moved on its outward stroke. As soon as this stroke commences, the collar 44 on its piston rod 16a releases the control switch 43 so that the magnets 35, 42 are de-energised and the valves 33, 40 respectively are closed. The piston 15 thus remains at the inner end of its cylinder 1 whilst the piston 16 completes its outward stroke. It is thought that this description is sufficient to indicate the operation of the apparatus shown in Figures 6 and 7.

The switches 43, 45, 46 and 47 may also be connected in the circuit of a counting mechanism (not shown) which may be preset to determine the number of strokes executed by each of the pistons 15, 16 in accordance with the volume of liquid to be discharged through the discharge line 14. Suitable counting mechanism is illustrated in Fig. 2 of the drawings. The operation of this arrangement will be sufficiently clear from the descriptions already given of the said counting mechanism and of the pistons 15, 16.

It will also be understood that more than two cylinders such as 1, 2 in Figs. 4 and 6 of the drawings may be provided if desired, each cylinder controlling the operation of one of the others so that cyclic operation is obtained. The rotary valves shown at 8, 8' (Fig. 4) may, if preferred, be replaced by valves connected in cascade.

Fig. 8 illustrates a modified form of cylinder construction and of valve control switch operating mechanism. In certain cases, it may be necessary to control the temperature of the fluid in the metering cylinder during operation of the apparatus, and to this end the cylinder 1 is provided with a water jacket 1a through which a heating or cooling fluid may be passed. Connections for the circuit of this fluid to and from the jacket are indicated at 1b.

It may also be necessary to ensure that no leakage can occur around the piston rod glands or at the adjusting screw for controlling the maximum length of stroke of the piston. In the arrangement shown in Fig. 8, the stroke adjusting screw 15b is enclosed in a thimble 15c which is screwed into a socket in the adjacent end wall of the cylinder 1 so as to form a fluid-tight enclosure for the adjusting screw.

At the opposite end of the cylinder 1, the piston rod projects through the end wall into the interior of a tube 48 which is concentric with the rod 15a and is similarly secured in fluid-tight fashion to the end wall. The tube 48 is of a non-magnetic material such as stainless steel, and is filled with the same fluid as that being pumped or metered through the cylinder 1. The internal diameter is such that a small bar magnet 49, clamped in position on the end of the piston rod 15a, may pass freely along the tube.

Located externally of the tube 48 are two sets of totally enclosed contacts 46, 47 which operate the change-over valve of the other cylinder (not shown) in the manner already described with reference to Figures 6 and 7. 4 and 4a and 5 and 5a are ports which would respectively be connected with the pipes 31 and 32 and 37 and 38 of Figure 6. Like considerations would apply to the other cylinder referred to (the cylinder 2 in Figure 6). As the piston 15 reaches either end of its stroke in Figure 8, the magnet 49 attracts one of the contact springs in the appropriate switches 46, 47 to make or break the circuit to the associated valve. The position of either switch 46, 47 is adjustable lengthwise of the tube 48 according to requirements. Other switches (not shown) may be located on the opposite side of the tube 48 for similar operation.

Figures 9 and 9a together illustrate a form of apparatus comprising two double cylinder units indicated generally at 101, 102 respectively, each arranged similarly to that shown in Figure 3 of the drawings. Each unit 101, 102 comprises coaxial cylinders 101a and 101b or 102a and 102b, respectively, within which work pistons 115 and 115' or 116 and 116', as the case may be. The pistons 115, 115' are mounted on a common piston rod 115a, while the pistons 116, 116' are mounted on a common piston rod 116a. The outer ends of each cylinder in each unit 101, 102 are connected through ports 104, 105 or 106, 107 to a corresponding changeover valve 50, 51 for the alternate admission of air under pressure to the appropriate cylinder on the one side of the corresponding piston, or the opening of the said cylinder on that side to exhaust. Each valve 50, 51 is controlled by a respective servo-motor 150, 151 as will be described below.

The inner ends of the cylinders in each unit 101, 102 are provided with inlet and exhaust ports 4a and 5a, 4b and 5b respectively, or 6a and 7a, 6b and 7b respectively, as the case may be. Each inlet port 4a, 4b, 6a, 6b is controlled by a non-return valve 48, whilst each exhaust port 5a, 5b, 7a, 7b is controlled by a non-return valve 49. The inlet ports 4a, 4b, 6a, 6b are connected to a common liquid supply line 52, and the exhaust ports 5a, 5b, 7a, 7b are connected to a common liquid delivery line 53.

Each valve 50, 51 has a rotary valve member 50a, 51a respectively in which is formed two valve passages 50b, 51b respectively. The valve 50 is operative to connect a compressed air supply line 54 to either the compressed air inlet port 104 or 105 in the respective cylinder 101a or 101b, whilst the other ports 105 or 104, as the case may be, is connected to exhaust at 55. The rotary valve member 50a is rotatable to reverse these connections in similar manner to the rotary valve member 28 in Figure 4. The valve 51 operates similarly with respect to the ports 106, 107 in the unit 102.

The valve operating motor 151 is reversible and is controlled through switches 143, 145 which are operated by a collar 114 mounted on the one end of the piston rod 116a of the unit 102, whilst the motor 150 which operates the changeover valve 51 is controlled by switches 146, 147 operated from the piston rod 115a in the unit 101.

This embodiment of the invention operates as follows. Considering first the unit 101 with the parts in the position shown, the piston 115' has been moved under air pressure admitted through the valve 50 to the port 105 to the extreme limit of its travel. Any liquid trapped in the cylinder 101b to the left of the piston 115' is discharged through the liquid outlet port 5b and non-return valve 49 to the discharge line 53, the valve 48 controlling the inlet port 4b being held on its seating by pressure of the liquid during this stroke of the piston 115'. Meanwhile, the port 104 is opened by the valve 50 to exhaust at 55 so that the piston 115 can move to the left in the cylinder 101a.

During this stroke, the drop in pressure in the cylinder 101a causes the non-return valve 49 controlling the liquid outlet port 5a to close on its seating, whilst the non-return valve 48 controlling the liquid in the port 4a is lifted off its seating and liquid is drawn from the supply line 52 into the cylinder. The cylinder 101a is thus charged with a known volume of liquid.

The parts stay in this position so long as the valve 50 is in the position shown. As soon, however, as the motor 150 is energised (in a manner to be described) to reverse the connections in the valve 50, the port 105 is opened to exhaust whilst air pressure is admitted through the port 104. The pistons 115 and 115' then move to the right, the former discharging the known volume of liquid in the cylinder 101a through the liquid outlet port 5a whilst the piston 115' draws liquid through the inlet port 4b into the cylinder 101b.

The valve operating motor 150 is energised through the appropriate switch 143 or 145 of the unit 102 when the piston rod 116a reaches the appropriate limit of its travel. Since both units 101 and 102 discharge into a common discharge line 53, the arrangement ensures that the discharge of liquid by the apparatus is substantially continuous over the desired period, or until the predetermined quantity of liquid has been delivered. It will be understood that the operation of the unit 102 is similar to that of the unit 101, and that control of the valve operating motor 151 is similarly effected by the piston rod 115a of the cylinder 101 through the switches 146 and 147.

It will be understood that the switches 143, 145, 146, 147 may be adjustable in the direction of the travel of the piston rods 115a, 116a so as to vary the instant of operation of the respective changeover valves 50, 51 according to requirements. In this way, it is possible to ensure substantially smooth and pulse-free delivery of liquid through the line 53. Limit switches (not shown) can be associated with the piston rods 115a, 116a for operating counting mechanism to determine the number of strokes to be made by the pistons of each unit in accordance with a predetermined volume of liquid to be delivered. Furthermore, mechanism such as that shown in Figure 2 of the drawings may be associated with each piston rod 115a, 116a for selecting desired fractions of a stroke in cases where the volume of liquid to be discharged is not an exact multiple of the volume of one cylinder.

In cases where the liquid being metered must be prevented from coming into contact with the atmosphere, the liquid circuit of apparatus according to the present invention can readily be completely sealed—if necessary. Provision may be made for the injection into the various piston rod and other glands, at a pressure equal to that of the liquid being metered, of a fluid which is chemically inert to the said liquid. An example of a liquid which must not come into contact with the atmosphere is carbon bi-sulphide.

Apparatus according to the present invention may be used for delivering known quantities of liquid in an industrial process, and may be used in conjunction with apparatus such as is described in co-pending United States patent application Serial No. 133,203, filed December 15, 1949, now Patent No. 2,656,109, whereby a preselected programme of deliveries of liquid, and other operations, can be automatically controlled, if desired, from a remote control point. It may also be employed in conjunction with apparatus for delivering known weights of material, for example, apparatus such as is described in the specifications of co-pending United States patent applications Serial Nos. 183,481, filed September 7, 1950, and 217,769, filed March 27, 1951. It may further be used as a continuous measuring device or a rate of flow meter, the form illustrated in Figure 8 of the drawings being regarded as particularly suitable for such an application.

A further advantage of apparatus according to the present invention is that the metering element itself constitutes a complete closure of the liquid circuit at the end of a pre-set metering operation, so that no excess liquid may pass to the delivery line. No subsidiary stop valve is thus required, with its attendant sources of error.

What I claim is:

1. Apparatus for the delivery of a predetermined volume of liquid comprising a metering chamber for the liquid, a positive displacement metering element which is reciprocable in the said chamber to discharge the liquid therein and means operated by the metering element for controlling the extent of the displacement thereof in a discharging operation in accordance with the predetermined volume of liquid to be delivered, the said means embodying rotary valve apparatus having ports connected respectively with a supply of fluid under pressure with a delivery for said liquid, and with the opposite ends of the metering chamber, a reversible electric motor operative to drive said rotary valve apparatus, a reversing switch to control said motor and electric contacts disposed in the circuit of said switch and operated at the end of predetermined displacement of said metering element in each direction of its reciprocation.

2. Apparatus for the delivery of a predetermined volume of liquid comprising a metering for the liquid, a positive displacement metering element which is reciprocable in the other chamber to discharge the liquid therein, rotary changeover valve apparatus in the liquid circuit for admitting liquid to the chamber alternately on either side of the metering element and exhausting liquid therefrom on the other side of the said element, and means operated by the metering element for controlling the position of the change-over valve apparatus, the said means embodying a reversible electric motor operative to drive said rotary change-over valve apparatus, a reversing switch to control said motor, and electric contacts disposed in the circuit of said switch and operated at the end of predetermined displacement of said metering element in each direction of its reciprocation.

3. Apparatus for the delivery of a predetermined volume of liquid comprising a metering chamber for the liquid, a positive displacement metering element which is reciprocable in the said chamber to discharge the liquid therein, rotary change-over valve apparatus in the liquid circuit for admitting liquid to the chamber alternately on either side of the metering element and exhausting liquid therefrom on the other side of the said element, said change-over valve comprising a valve body having a first port for connection to the metering chamber, a second port for connection to the source of liquid supply, and an exhaust port, a rotary valve member in said body and having a duct formed therein for registering, in one position of the valve member, with the first and second ports simultaneously and in the other position with the first and exhaust ports simultaneously, and mechanical means connected to said valve member and engageable by the metering element during its stroke for positively reversing the position of such valve member.

4. Apparatus for the delivery of a predetermined volume of liquid comprising a metering chamber for the liquid, a positive displacement metering element which is reciprocable in said chamber to discharge the liquid therein, change-over valve apparatus operated by the metering element for controlling the extent of the displacement thereof in a discharging operation in accordance with the predetermined volume of liquid to be delivered a main stop valve in the hydraulic circuit to the change-over valve apparatus, electrical means for controlling the stop valve, and means for counting a preselected number of strokes of the reciprocable metering element and for operating the electrical valve control means to close the main stop valve when the preselected number of strokes has been counted.

5. Apparatus as claimed in claim 4 including counting means comprising a uniselector switch embodying a series of levels, a limit switch operable by the reciprocable metering element at the end of a stroke and connected in the circuit of the driving magnet thereof, and a connection between a preselected contact on a level of the said uniselector switch and the electrical valve control means.

6. Apparatus for delivering a predetermined volume of liquid comprising liquid-metering apparatus embodying a pair of liquid-metering cylinders each having a port adjacent each end for the passage of liquid to and from the cylinder, a piston displaceable in each cylinder, valve means associated with each cylinder for connecting one port to the liquid supply and the other to a delivery line, and vice versa, an operative connection between each valve means and the piston of the other cylinder whereby the said valve means is controlled by the other piston, and means operative to enable a preselected plurality of strokes of each piston to take place at each metering operation.

7. Apparatus as claimed in claim 6 wherein the operative connection comprises a piston rod secured to each piston and carrying a pair of axially spaced abutments, and a lever mechanism connected to each valve member and having a component thereof located for engagement and displacement in a valve operating movement by either abutment on the piston rod secured to the other piston.

8. Apparatus as claimed in claim 7 in combination with an electrical counting circuit for measuring the volume of liquid delivered by the metering cylinders and comprising electromagnetic step-by-step mechanism, a pair of switches associated with the respective pistons for energising said mechanism at a predetermined point in the stroke of each piston, said mechanism being arranged so that the operation of each of said switches sets that mechanism for its operation by the other switch, electrically operated means for cutting off the supply of liquid to the cylinders, and a circuit connection between said electrically operated means and a component of the step-by-step mechanism for energizing the former after pistons have together made the number of strokes corresponding to the predetermined volume of liquid.

9. Liquid measuring apparatus comprising liquid-metering apparatus embodying a pair of liquid-metering cylinders connected to a common source of liquid supply, a piston displaceable in each cylinder, a port adjacent each end of the cylinder and each connected to a pair of electrically operated stop valves for alternative connection of the port to the source of liquid supply and to a liquid discharge point, switch means associated with each piston and operable at a given point in the stroke thereof for energising the appropriate stop valve operating mechanisms associated with the other cylinder, and means operative to enable a preselected plurality of strokes of each piston to take place at each metering operation.

10. Liquid measuring apparatus comprising a pair of similar metering cylinders mounted coaxially with each other, a piston working in each cylinder, a rigid connection between the pistons, liquid inlet and exhaust ports at the one end of one cylinder and the other end of the other cylinder, a pressure fluid port at the opposite end of each cylinder, and change-over valve means operated by displacement of the pistons for alternately connecting the one pressure fluid port to the pressure fluid supply and the other pressure fluid port to exhaust, and vice versa.

11. Liquid dispensing apparatus comprising a cylinder, a piston reciprocable in said cylinder, ports formed through the cylinder wall adjacent each end of the cylinder, a piston rod secured to the piston and extending through an end wall of the cylinder, a fluid-tight tube of non-magnetic material surrounding the projecting end of the said piston rod, magnetically operated contacts located externally of the tube, and a magnet carried on the projecting end of the piston rod and adapted to operate the said contacts.

References Cited in the file of this patent

UNITED STATES PATENTS

| | | |
|---|---|---|
| 1,355,208 | Bassler | Oct. 12, 1920 |
| 1,421,905 | Cade | July 4, 1922 |
| 1,470,381 | Lamb | Oct. 9, 1923 |
| 1,470,684 | Cade | Oct. 16, 1923 |
| 1,527,678 | Farquhar | Feb. 24, 1925 |
| 1,534,238 | Mercer | Apr. 21, 1925 |
| 1,817,552 | Galloway | Aug. 4, 1931 |
| 1,932,976 | Lamb | Oct. 31, 1933 |
| 2,082,788 | Brayer | June 8, 1937 |
| 2,186,379 | Harrington et al. | Jan. 9, 1940 |
| 2,209,608 | Nye et al. | July 30, 1940 |
| 2,462,571 | Thompson et al. | Feb. 22, 1949 |